US005181701A

United States Patent [19]

Yonezawa

[11] Patent Number: 5,181,701

[45] Date of Patent: Jan. 26, 1993

[54] HYDRAULIC CLAMP

[75] Inventor: Keitaro Yonezawa, Kobe, Japan

[73] Assignee: Kabushiki Kaisha KOSMEK, Hyogo, Japan

[21] Appl. No.: 838,683

[22] Filed: Feb. 21, 1992

[30] Foreign Application Priority Data

Feb. 22, 1991 [JP] Japan ........ 3-77395

[51] Int. Cl.[5] ........ B23Q 3/08

[52] U.S. Cl. ........ 269/32; 269/136; 269/137

[58] Field of Search ........ 269/24, 32, 93, 234, 269/136, 137–138, 25, 134, 157; 91/410; 60/588

[56] References Cited

U.S. PATENT DOCUMENTS

| | | | |
|---|---|---|---|
| 2,987,972 | 6/1961 | Schneider | 269/137 |
| 3,248,122 | 4/1966 | Roddy | 269/137 |
| 3,512,794 | 5/1970 | Lohman | 269/136 |
| 3,595,112 | 7/1971 | De George | 269/137 |
| 4,406,445 | 9/1983 | Seidel | 269/32 |
| 4,410,169 | 10/1983 | Swenson . | |
| 4,506,871 | 3/1985 | Yonezawa | 269/32 |
| 4,932,640 | 6/1990 | Shirakawa . | |
| 5,071,109 | 12/1991 | Yonezawa . | |

FOREIGN PATENT DOCUMENTS

| | | |
|---|---|---|
| 3436051 | 4/1986 | Fed. Rep. of Germany . |
| 3733676 | 4/1989 | Fed. Rep. of Germany . |
| 56-163854 | 12/1981 | Japan . |

*Primary Examiner*—Robert C. Watson
*Attorney, Agent, or Firm*—Bacon & Thomas

[57] ABSTRACT

A clamping device including a clamp housing a generally horizontally extending cylinder bore that opens into an upwardly and rearwardly sloping guide bore formed in a front portion of the clamp housing is disclosed. A clamping member is shiftably mounted within the guide bore and a piston is shiftably mounted within the cylinder bore. The clamping member is formed with a groove into which a projection, carried by the piston, is fitted. By this arrangement, movement of the piston forces the clamping member to shift in an inclined direction between clamping and unclamping positions.

5 Claims, 5 Drawing Sheets

HYDRAULIC CLAMP

BACKGROUND OF THE INVENTION

1. Field of the Invention

The present invention relates to a hydraulic clamp adapted to clamp an object to be clamped (referred to as a clamped object hereinafter) such as a metal mould and the like onto a fixed angular table, for example of a press machine and an injection moulding machine, and more specifically to a hydraulic clamp of the type including a clamping member adapted to be actuated for clamping along an axis declining in a forward direction relative to the clamped object.

2. Description of the Related Arts

Such a known hydraulic clamp is disclosed in Japanese Patent Laid Open Publication No. 56-163854.

This prior art is constructed as follows as illustrated in a partial view of FIG. 1 of the above-mentioned Publication. In a clamp housing, a guide bore for a clamping member and a cylinder bore of a hydraulic cylinder are formed in series in a backwardly acclivous direction. The clamping member inserted into the guide bore and a piston inserted into the cylinder bore are formed integrally as a one member, and a clamping actuation oil chamber is formed therein behind and above the piston. Accordingly, the clamping member is adapted to be actuated along an axis declining in a forward direction by means of an oil pressure acting on the piston from the oil chamber.

There are, however, following problems associated with the above-mentioned prior art.

Since a peripheral wall and an end wall of the cylinder bore project largely in a backwardly acclivous direction from a peripheral wall of the guide bore, a height of the hydraulic clamp becomes high.

When an oil pressure within the oil chamber decreases or vanishes accidentally due to pressurized oil leakage, the clamping member is easily retracted by a disturbing force or a gravitation acting on the clamped object such as a metal mould. Therefore, it is apprehended that accidents such as sudden shifts and droppings of the clamped object from the table would happen.

SUMMARY OF THE INVENTION

It is a first object of the present invention to lower a height of a hydraulic clamp. It is a second object of the present invention to maintain a clamping condition even though an oil pressure within a clamping actuation oil chamber decreases or vanishes.

For accomplishing the above-mentioned objects, the present invention resides in a hydraulic clamp with an inclined clamping member constructed as follows.

In a front portion of a clamp housing a guide bore for insertion of a clamping member is so formed as to extend in a backwardly acclivous direction. In a rear portion of the clamp housing a cylinder bore of a hydraulic cylinder is formed generally horizontally so as to communicate crosswise with the guide bore. A push/pull drive portion is disposed before a piston and a driven portion is formed in the clamping member. The driven portion is coupled onto the push/pull drive portion relatively movably in the vertical direction. By moving the aforementioned push/pull drive portion in the forward and backward directions by means of the piston the clamping member is actuated by the push/pull drive portion in the inclined directions through the aforementioned driven portion.

The present invention operates as follows.

Under an unclamping condition, the piston has been changed over to an unclamping retracted position and the push/pull drive portion provided in the piston has actuated and retracted the clamping member to an unclamping position through the driven portion.

When changing over from the aforementioned unclamping condition to a clamping condition, the piston is actuated so as to be advanced to the front side. Thereupon, the push/pull drive portion pushes the driven portion to the front side, and then the driven portion advances lowering relative to the drive portion so as to actuate the clamping member along the guide bore in the declining direction. Thereby, the clamping member is changed over to a clamping position.

To the contrary, when changing over from the clamping condition to the unclamping condition, the piston is actuated so as to be retracted to the rear side. Thereupon, the push/pull drive portion serves to push the driven portion toward the rear side, so that the driven portion retracts rising relative to the drive portion to actuate the clamping member along the guide bore in the acclivous direction. Thereby, the clamping member is changed over to an unclamping position.

Under the aforementioned clamping condition, a friction force acts on a clamping reaction force receiving surface between the peripheral wall of the guide bore and the clamping member and another friction force acts also on a push abutting portion between the push/pull drive portion and the driven portion, so that both these friction forces function as a clamping holding force. Therefore, even when the oil pressure within the clamping actuation oil chamber decreases or vanishes accidentally due to the pressurized oil leakage and so on, it becomes possible to maintain the clamping member in the clamping position to prevent sudden shifts and/or dropping accidents of the clamped object such as a metal mould.

Incidentally, when the push/pull drive portion comprises an engagement projection and the driven portion comprises an engaged groove, since a coupling construction provided between both these can be simplified, the hydraulic clamp can be manufactured compact and have such a construction as to suffer less troubles. Further, since the push abutting surface between the projection and the groove can secure a large friction force when being made larger in area, sudden shifts of the clamped member can be more effectively prevented.

Since the present invention is constructed and operates as mentioned above, the following advantages are attained.

Since the cylinder bore of the hydraulic cylinder is disposed generally horizontally behind the guide bore for the clamping member, the peripheral wall and the end wall of the cylinder bore don't project backwardly acclivously from the peripheral wall of the guide bore. Further, since the guide bore is not subjected to the oil pressure, it is possible to make the end wall much thinner than that of the oil chamber according to the prior art. Therefore, the height of the hydraulic clamp can be lowered.

Under the clamping condition, since in addition to the friction force acting between the peripheral wall of the guide bore and the clamping member another friction force acts also between the push/pull drive portion and the driven portion so that these friction forces can function as the clamping holding force, a force serving to hold the clamping member in the clamping position becomes larger. Accordingly, even though the oil pressure within the clamping actuation oil chamber decreases or vanishes due to the pressurized oil leakage and so on, the clamping member can be held strongly in the clamping position and it is possible to prevent sudden shifts or droppings of the clamped object such as the metal mould.

BRIEF DESCRIPTION OF THE DRAWINGS

The above and other important advantages of the present invention will be better understood from the following detailed description of preferred embodiments of the invention, made with reference to the accompanying drawings, in which:

FIG. 1 is a vertical sectional side view illustrating a clamping condition of a hydraulic clamp;

FIG. 2 is a plan view of the hydraulic clamp;

FIG. 3 is a back view of the hydraulic clamp;

FIG. 4 is a vertical sectional side view illustrating an unclamping condition of the hydraulic clamp;

DESCRIPTION OF THE PREFERRED EMBODIMENTS

First Embodiment

FIGS. 1 through 4 show a first embodiment of a hydraulic clamp of the present invention.

Figure 1:
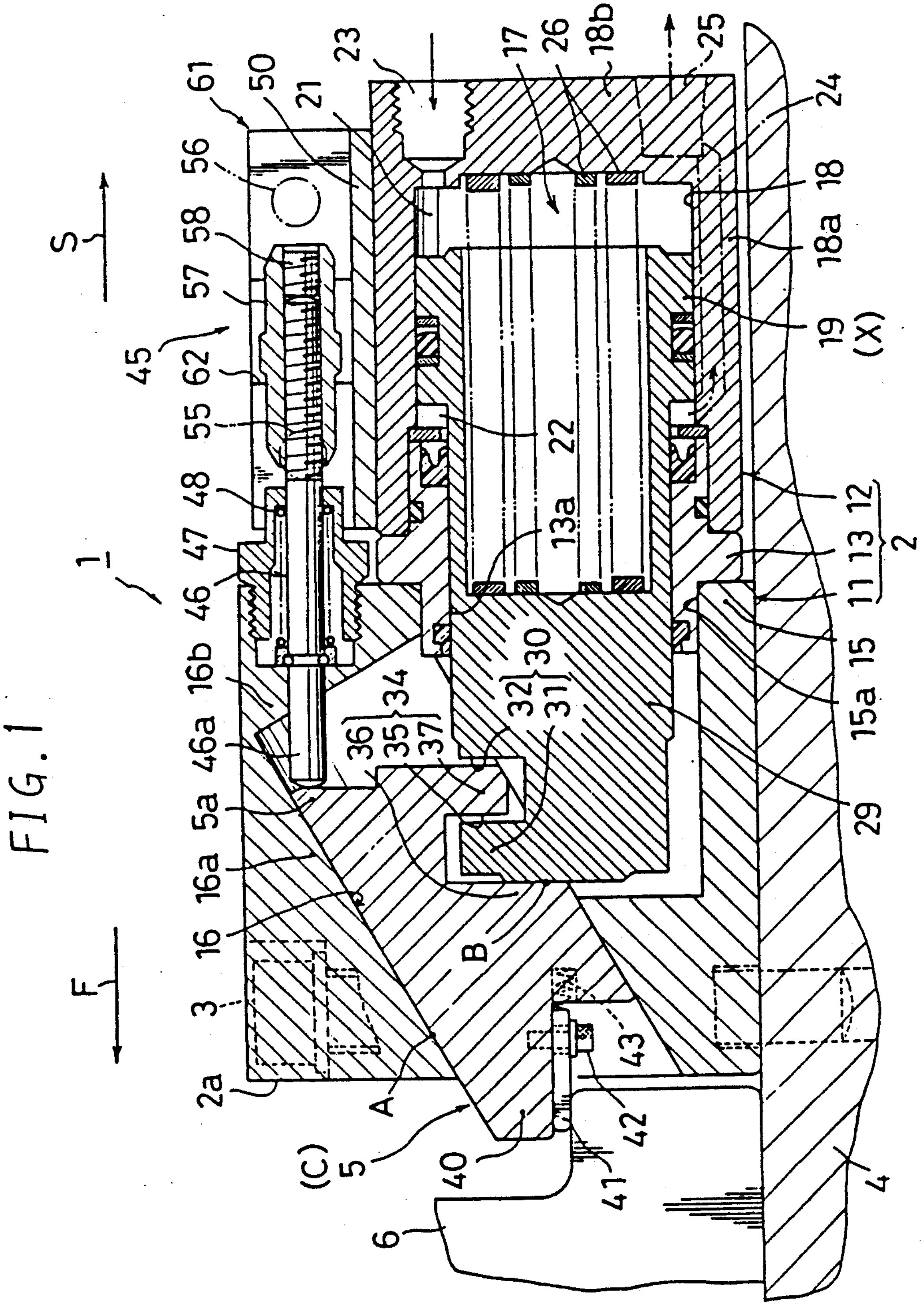
FIGS. 1 through 4 show a first embodiment of the present invention.
Figure 2:
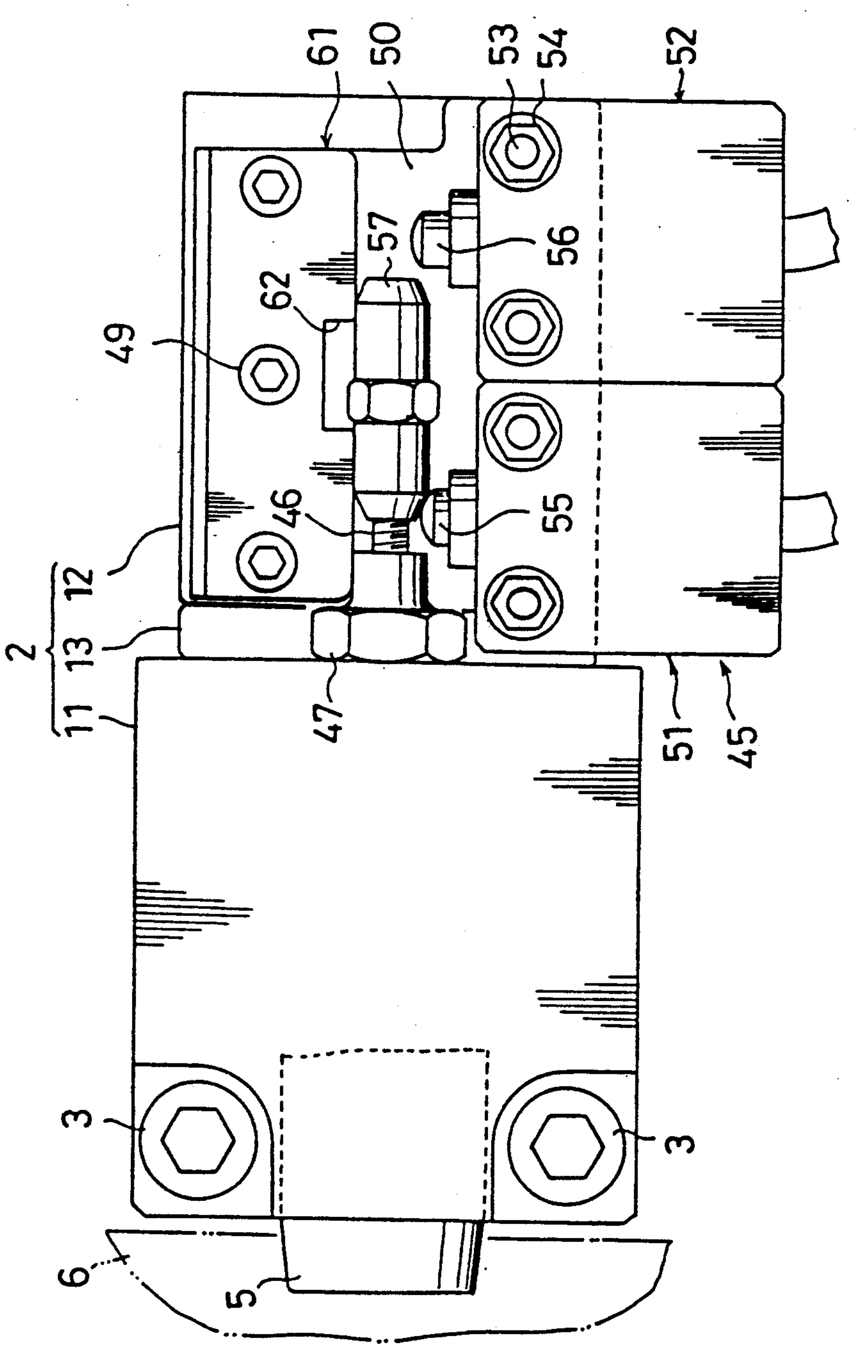
Figure 3:
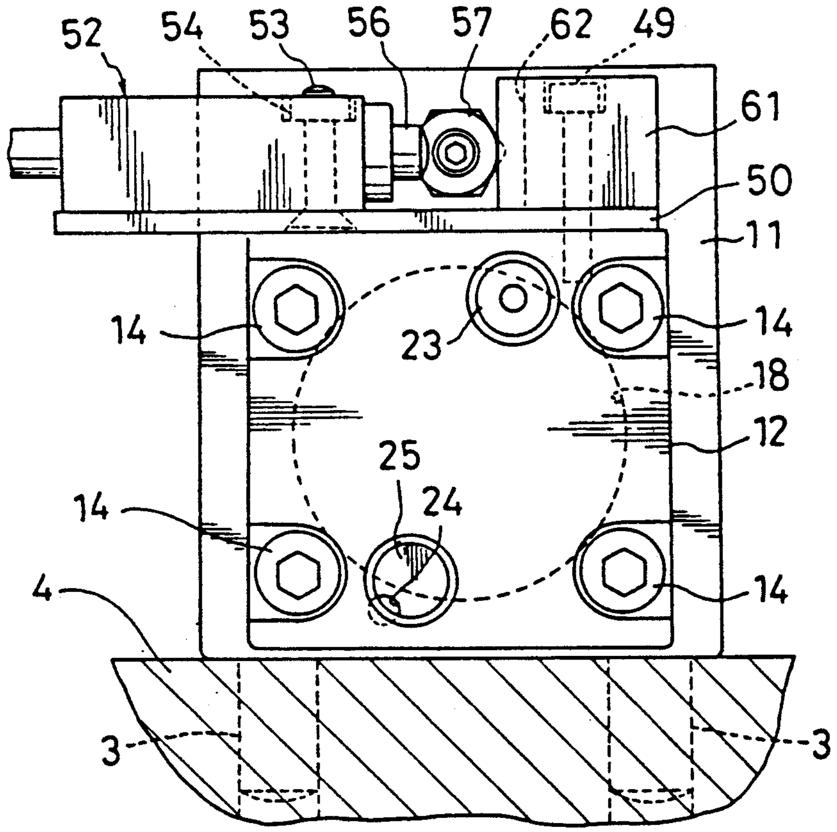

As shown mainly in FIG. 1, a front portion of a clamp housing 2 of a hydraulic clamp 1 is fixedly secured onto a fixed table 4 by means of two bolts 3, 3 and a metal mould 6 is fixedly clamped onto the fixed table 4 by means of a clamping member 5 projected from a front end 2*a* of the housing 2 in a declining direction. By the way, a front side (a first end side) F in a forward and backward orientation of the hydraulic clamp 1 is designated by a leftwards pointed arrow in FIG. 1 and a back side (a second end side) S therein is designated by a rightwards pointed arrow in FIG. 1.

The aforementioned housing 2 comprises a first housing 11 on the front side F, a second housing 12 on the back side S and an intermediate housing 13 mounted between both these housings 11, 12. The respective housing 11, 12, 13 are formed in a rectangular prism configuration, and the second housing 12 and the intermediate housing 13 are fixedly secured to a flange 15 formed in a back lower portion of the first housing 11, by means of four bolts 14 as connecting members.

A circular guide bore 16 is formed in the aforementioned first housing 11 so as to extend from the housing front end 2*a* in a backwardly acclivous direction. A round pillar-shaped clamping member 5 inserted into the guide bore 16 is adapted to be changed over between a clamping position C on the slantly lower side (refer to FIG. 1) and an unclamping position U on the slantly upper side (refer to FIG. 4) by means of a double-acting hydraulic cylinder 17 disposed within the second housing 12.

A cylinder bore 18 of the hydraulic cylinder 17 is formed generally horizontally and is communicated crosswise with the guide bore 16 through a cylindrical bore 13*a* of the intermediate housing 13. A first oil chamber 21 for clamping actuation is arranged behind the piston 19 inserted into the cylinder bore 18, and a second oil chamber 22 for unclamping actuation is arranged before the piston 19. The first oil chamber 21 is communicated with a first supply/discharge port 23. The second oil chamber 22 is communicated with a second supply/discharge port 25 through a communication passage 24. After the piston 19 has been actuated to a clamping advanced position X by an oil pressure within the first oil chamber 21, it is held in the advanced position X by means of a clamping condition holding spring 26 comprising two square springs. To the contrary, the piston 19 is adapted to be actuated to an unclamping retracted position Y by means of an oil pressure within the second oil chamber 22 against a resilient force of the spring 26.

In a front upper portion of a piston rod 29 protruded forwardly from the piston 19 there is provided a push/pull drive portion 30 comprising an engagement projection 31 and an interference prevention groove 32. In relation to the drive portion 30, the clamping member 5 is provided with a driven portion 34 comprising an engaged groove 35 and front and back walls 36, 37. The engagement projection 31 inserted into the engaged groove 35 is brought into contact with the front wall 36 or the back wall 37 so as to actuate the clamping member 5 and allows the contacted wall 36 (or 37) to relatively slide vertically so as to move the clamping member 5 along the guide bore 16 in the inclined directions.

Incidentally, between a pressing portion 40 formed in the front lower portion of the clamping member 5 and a clamped object 6 there is interposed a shuttle member 41 made of surface-hardened alloy steel. The shuttle member 41 is supported by the lower surface of the pressing member 40 through a plurality of bolts 42 so as to move slidably in the forward and backward directions and is resiliently urged forwardly by means of a spring 43.

A clamping/unclamping condition detection device 45 is disposed above the aforementioned second housing 12. That is, a detection rod 46 is inserted into the rear upper portion of the first housing 11 through a guide bolt 47 so as to be movable in the forward and backward directions. The detection rod 46 is resiliently urged forwardly by means of an advancement spring 48, and a detection portion 46*a* formed in its front end is put through an end wall 16*b* of the guide bore 16 so as to be brought into contact with a rod drive portion 5*a* of the clamping member 5.

An upper plate 50 is fixedly secured onto an upper surface of the second housing 12 by means of three bolts 49. A first limit switch 51 for detecting the clamping condition and a second limit switch 52 for detecting the unclamping condition are fixedly secured onto the front and the back portions of the upper plate 50 respectively by means of two sets of countersunk head bolts 53 and nuts 54, and each contactor 55, 56 of each limit switch 51, 52 is faced to a actuation cam 57 threadably engaged with the detection rod 46. The symbol 58 designates a lock bolt.

On the opposite side to the limit switches 51, 52 with respect to the actuation cam 57, a guide block 61 is fixedly secured onto the second housing 12 by means of the aforementioned bolts 49. Since this guide block 61 serves to guide the actuation cam 57 straightly in the forward and backward direction, the diameter of the detection rod 46 can be reduced and it is possible to prevent foreign substances from coming into collision with the actuation cam 57 and the limit switches 51, 52. Incidentally, a groove 62 for preventing an interference with the actuation cam 57 is formed in the guide block 61.

The above-mentioned hydraulic clamp 1 operates as follows.

Figure 4:
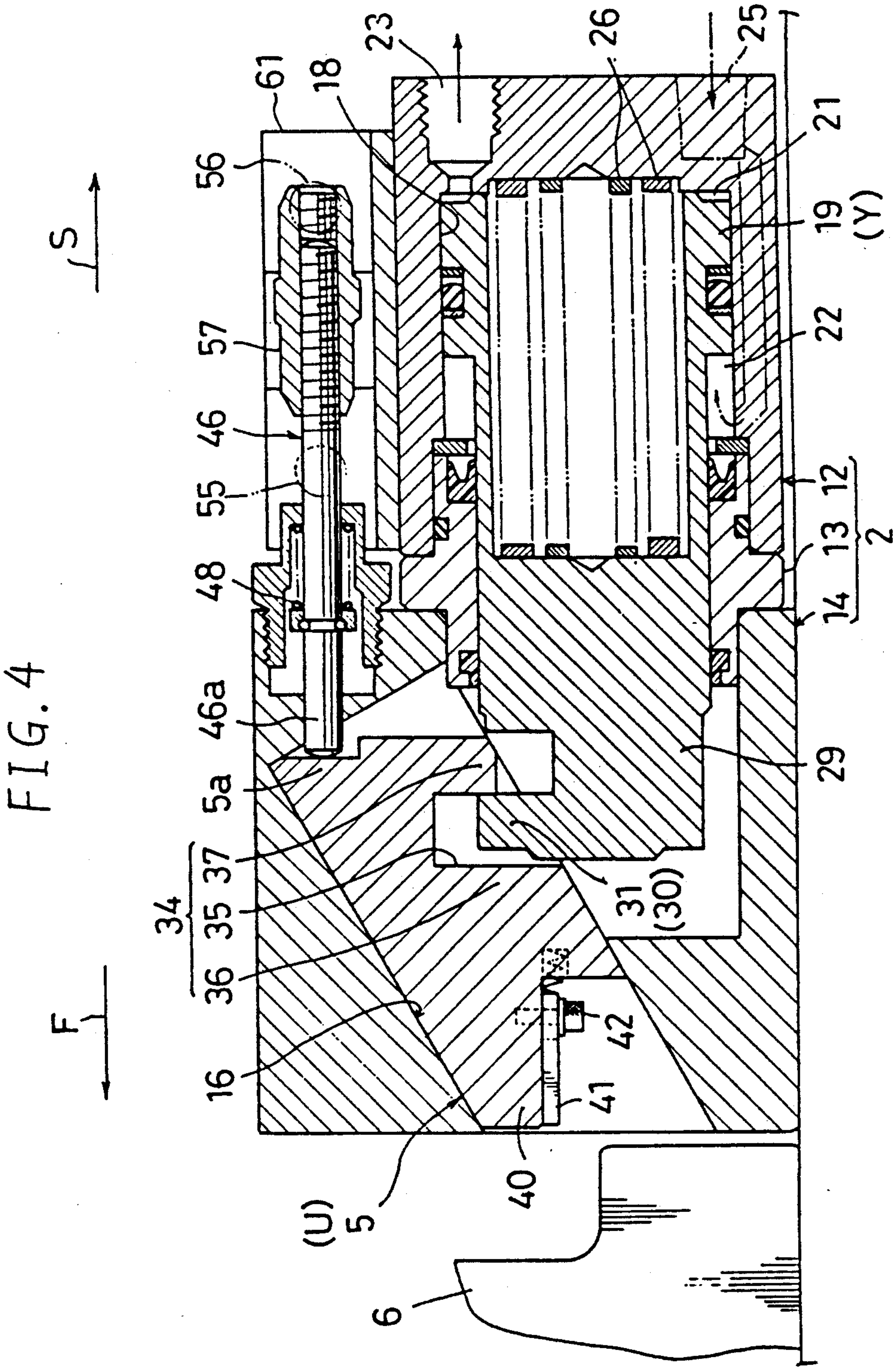

As shown in FIG. 4, under the unclamping condition the pressurized oil is discharged from the first supply/-discharge port 23 (refer to the arrow depicted by the solid line) and the pressurized oil is supplied to the second supply/discharge port 25 (refer to the arrow depicted by the alternate long and short dash line). Thereby, the piston 19 is changed over to the unclamping retracted position Y and the clamping member 5 is changed over to the unclamping position U. The shuttle member 41 is advanced toward the front side F by means of the spring 43 relative to the pressing portion 40 of the clamping member 5.

When changing over from the unclamping condition as illustrated in FIG. 4 to the clamping condition as illustrated in FIG. 1, the pressurized oil is discharged from the second supply/discharge port 25 (refer to the arrow depicted by the alternate long and short dash line) and the pressurized oil is supplied to the first supply/discharge port 23 (refer to the arrow depicted by the solid line). Thereupon, the piston 19 is advanced by means of both the oil pressure within the first oil chamber 21 and the resilient force of the spring 26, the engagement projection 31 formed in the front end portion of the piston rod 29 pushes the front wall 36 of the engaged groove 35 toward the front side F so as to advance the clamping member 5 in the declining direction.

When the lower surface of the shuttle member 41 is brought into contact with the metal mould 6, firstly the shuttle member 41 is frictionally secured to the metal mould 6 by means of a friction force between both these. Subsequently, the lower surface of the pressing portion 40 slides relative to the upper surface of the shuttle member 41 and the clamping member 5 advances leaving the shuttle member 41 behind. Thereby, the clamping member 5 is changed over to the clamping position C to strongly clamp the metal mould 6 onto the table 4.

Under the above-mentioned clamping condition, when the oil pressure within the first oil chamber 21 decreases or vanishes due to the pressurized oil leakage and so on, since the clamping condition holding spring 26 pushes the clamping member 5 strongly through the engagement projection 31 and the front wall 36 of the engaged groove 35 in order, it becomes possible to prevent sudden shifts or droppings of the metal mould 6 which might be caused by a disturbing force or a gravitational force. In this case, since in addition to a friction force acting on a clamping reaction force receiving surface (A) between the clamping member 5 and the guide bore 16 another friction force acting on a push abutting surface (B) between the engagement projection 31 and the front wall 36 functions as a force for holding the clamping member 5 in the clamping position C, it becomes possible to prevent the above-mentioned problem surelier.

Incidentally, when the metal mould 6 is clamped by means of the clamping member 5 from above as illustrated, it is possible to hold the clamping member 5 in the clamping position C only by the friction forces acting on both those surfaces (A), (B). Therefore, the aforementioned clamping condition holding spring 26 may be omitted. But, when a gravity of the metal mould effects like such a case in which the metal mould is clamped by means of the clamping member from below or from lateral, it is preferable to install the spring 26.

In accompany with the advancement of the clamping member 5, the detection rod 46 and the actuation cam 57 are advanced by means of the spring 48. Thereby, the cam 57 serves to retract the first contactor 55 and permits the second contactor 56 to advance, so that both the limit switches 51, 52 transmit a detection signal of the clamping condition to a control device (not illustrated).

When changing over from the clamped condition as shown in FIG. 1 to the unclamping condition as shown in FIG. 4, the piston 19 is retracted by means of the oil pressure within the second oil chamber 22. Thereupon, the engagement projection 31 serves to retract the clamping member 5 through the back wall 37 of the engaged groove 35. Thereby, firstly the lower surface of the pressing portion 40 slides backwardly relative to the upper surface of the shuttle member 41 frictionally secured to the metal mould 6 so as to cancel the clamped condition of the metal mould 6. Subsequently, the pressing portion 40 retracts together with the shuttle member 41 and the clamping member 5 changes over to the unclamping position U.

In accompany with the retraction of the clamping member 5, the rod 46 and the cam 57 are retracted against the spring 48. Thereby, the cam 57 permits the first contactor 55 to advance and at the same time retracts the second contactor 56, so that both those limit switches 51, 52 transmit the detection signal of the unclamping condition to the control device (not illustrated).

Then, the hydraulic clamp 1 is assembled in accordance with the following procedures.

Firstly, the piston 19 and the intermediate housing 13 are inserted into the second housing 12 in order from left side so as to provide a preassembly of the hydraulic cylinder 17. After that, under a leftwards acclivous condition of the preassembly only the piston rod 29 is projected leftwards so that its left portion can be inserted into the first housing 11 through a flange port 15a for the engagement projection 31 to be fitted into the engaged groove 35. Finally, the left end portion of the intermediate housing 13 is inserted into the flange port 15a, and the intermediate housing 13 and the second housing 12 are fixedly secured to the flange 15 by means of a plurality of bolts 14.

According to the above-mentioned embodiment, advantages mentioned in the following paragraphs (1) through (9) can be attained.

(1) A height of the hydraulic clamp can be lowered.

Since the cylinder bore 18 of the hydraulic cylinder 17 is disposed generally horizontally behind and below the guide bore 16 for the clamping member 5, both the peripheral wall 18a and the end wall 18b of the cylinder bore 18 don't project backwardly acclivously from the peripheral wall 16a of the guide bore 16. Further, since the guide bore 16 is not subjected to an oil pressure, the end wall 16b can be made much thinner than an end wall of an oil chamber according to the prior art. Accordingly, by reducing a height of the clamp housing 2 the overall height of the hydraulic clamp can be lowered.

(2) The clamping condition can be maintained.

Even when the oil pressure within the first oil chamber 21 for clamping actuation lowers or vanishes, since the clamping member 5 can be held in the clamping position C by means of the friction force which is acting between the push/pull drive portion 30 and the driven portion 34 and is added to the friction force acting on the clamping reaction force receiving surface (A) between the clamping member 5 and the guide bore 16, it becomes possible to prevent sudden shifts or dropping accidents of the metal mould 6.

(3) A construction for holding the clamping condition can be simplified.

At the time of attainment of the advantage of the paragraph (2), by constructing the push/pull drive portion 30 by the engagement projection 31 and constructing the driven portion 34 by the engaged groove 35, a coupling construction between both those portions 30, 34 can be simplified. As a result, the hydraulic clamp can be made compact and will hardly break down. Further, since a large friction force can be secured by providing a large area for the push abutting surface (B) between the projection 31 and the groove 35, the preventive effect against sudden shifts and so on of the clamped object is increased.

(4) An overall length of the hydraulic clamp can be shortened.

Since the piston rod 29 is engaged with the clamping member 5 from below so as to assemble both these 5, 29 in an overlapped manner, the overall length of the hydraulic clamp 1 can be shortened.

(5) An upper space above the hydraulic cylinder can be effectively used.

Since the clamping/unclamping condition detection device 45 is disposed in a space above the cylinder bore 18 and behind the guide bore 16, it is possible to effectively use the upper space above the hydraulic cylinder 17 and to lower the height of the hydraulic clamp 1. Further, since it is possible to access the detection device 45 from above, the maintenance can be readily carried out.

(6) Since the clamp housing 2 is divided into a plurality of housings 11, 12, 13, it becomes easier to assemble the hydraulic clamp 1 and a manufacturing cost thereof can be reduced.

(7) Since the guide bore 16 requiring a comparatively low necessary machining accuracy and the cylinder bore 18 requiring a fine machining for sealing are formed separately in the respective housings 11, 12, the total manufacturing cost of the clamp housing 2 can be reduced.

(8) Further, since the guide bore 16 is spaced apart from the cylinder bore 18 so that foreign substances such as dusts and abrasion grains having entered the guide bore 16 can be prevented from being bitten into the cylinder bore 18, the durability of sealing of the hydraulic cylinder 17 is improved.

(9) Since it is possible to select one combination most suitable for one member from various combinations of kinds of material, heat treatments, surface hardenings and so on regardless of the other member by separately manufacturing both members of the clamping member 5 and the piston 19, the most suitable design of the hydraulic clamp can be made.

Incidentally, the above-mentioned embodiment may be modified as the following paragraphs (a) through (c).

(a) The coupling construction between the push/pull drive portion of the piston and the driven portion of the clamping member may be of the link type.

(b) A proximity switch may be used instead of the limit switch, and a detection portion of the proximity switch is faced to the clamping member.

(c) The clamping housing may be manufactured as one block.

Figure 5:
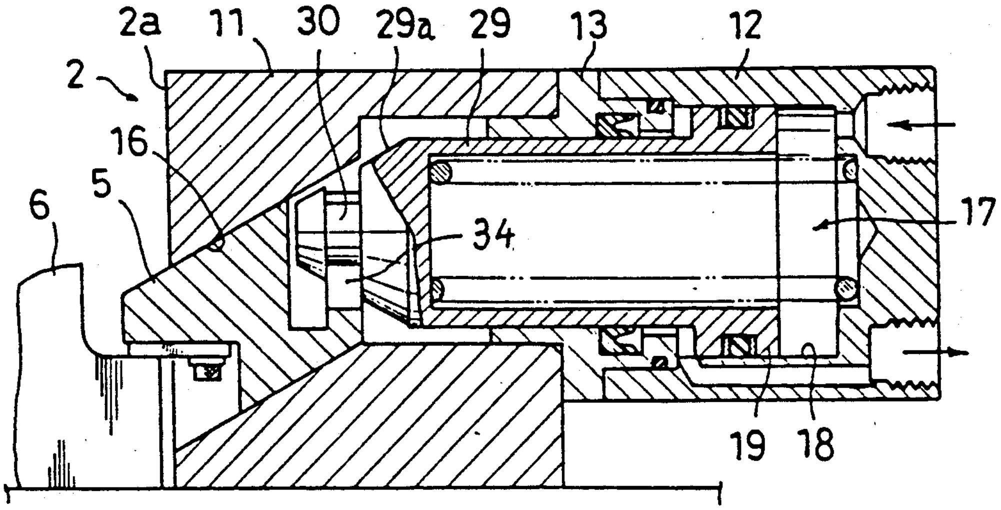
FIG. 5 shows a second embodiment of the present invention and is a view corresponding to FIG. 1.
Figure 6:
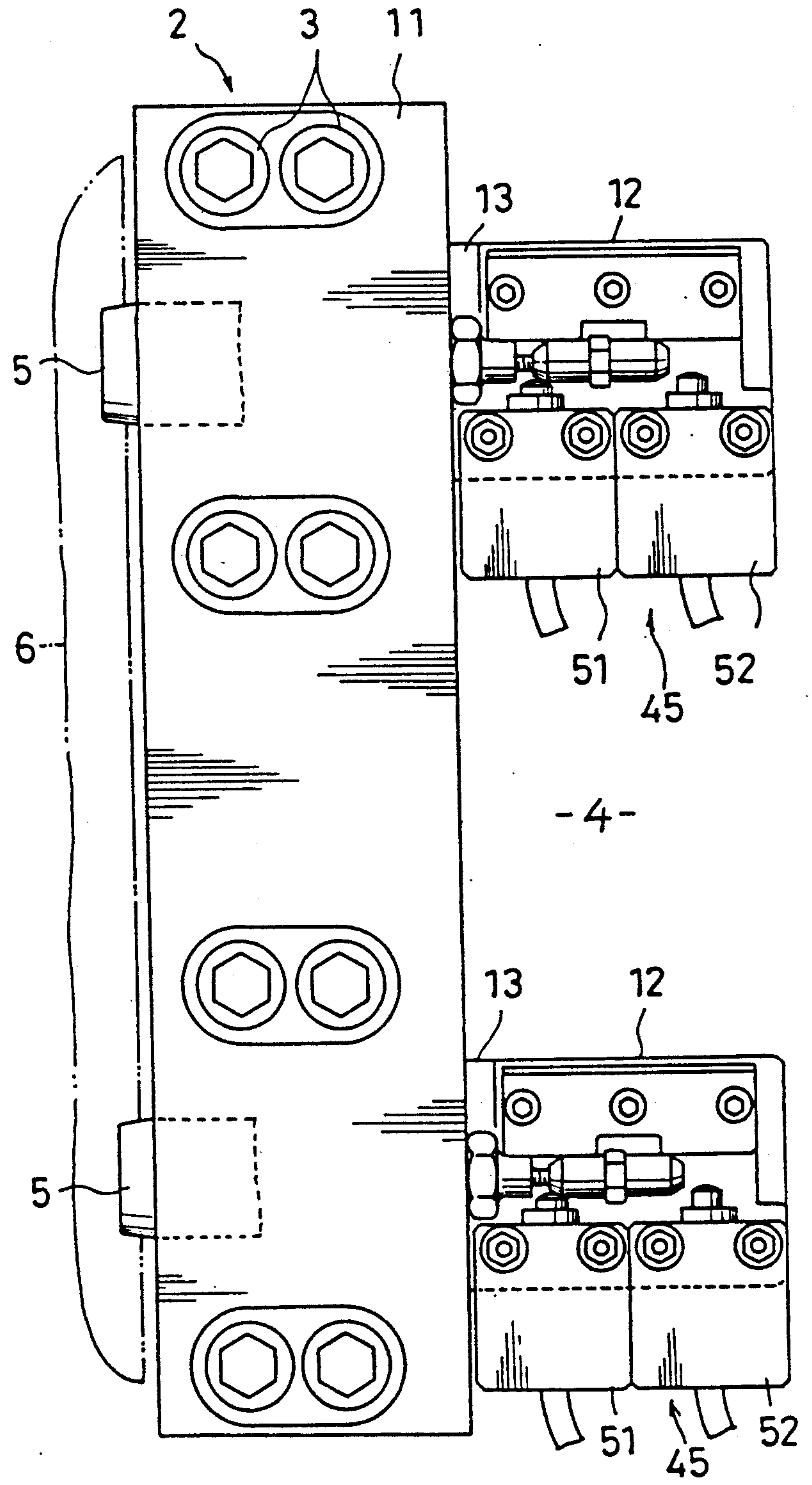
FIG. 6 shows a multi-arranged type hydraulic clamp of a third embodiment of the present invention and is a view corresponding to FIG. 2.

FIGS. 5 and 6 show a second and a third embodiments of the present invention, and different constructions from the above-mentioned first embodiment will be explained. Incidentally, in the respective embodiments component members having the same construction as those in the first embodiment will be designated by the same symbols.

Second Embodiment

As shown in FIG. 5, the second housing 12 and the intermediate housing 13 are fixedly secured to the rear upper portion of the first housing 11. The push/pull drive portion 30 is projected forwardly from the piston rod 29. The driven portion 34 comprises an upwardly opened U-shaped groove formed in the rear portion of the clamping member 5. The drive portion 30 is fitted into the U-shaped driven portion 34 from above.

According to the second embodiment, since the lower slide surface of the clamping member 5 can be made longer than that of the first embodiment, the friction force acting between the clamping member 5 and the guide bore 16 can be increased. Further, when a tapered shoulder surface 29*a* of the piston rod 29 is fitted into the guide bore 16, also a friction force acting the fitting surface can be effectively utilized as the clamping holding force. Accordingly, the clamping holding force is sufficiently large at the time of vanishment of the oil pressure.

Third Embodiment

In FIG. 6, a hydraulic clamp is of the multi-arranged type. That is, two clamping members 5 are arranged side by side within the first housing 11 constructed in a horizontally elongated configuration. In relation to the respective clamping members 5, the intermediate housing 13 and the second housing 12 are fixedly secured in order to the back surface of the first housing 11. Similarly to the first embodiment, the second housing 12 is provided with the hydraulic cylinder (not illustrated herein) and the clamping/unclamping condition detection device 45. The first housing 11 is fixedly secured to the table 4 by means of eight bolts 3. The symbol 6 designates the metal mould.

By the way, the aforementioned detection devices 45, 45 may be arranged symmetrically. Further, in the multi-arranged type hydraulic clamp there may be disposed at least three clamping members 5.

According to the third embodiment, since component members such as the clamping member 5, the second housing 12, the intermediate housing 13, the hydraulic cylinder, the detection device 45 and so on can be manufactured as common parts except the first housing 11, the manufacturing cost of the multi-arranged type hydraulic clamp can be reduced.

Many different embodiments of the invention will be obvious to those skilled in the art, some of which have been disclosed or referred to herein, hence it is to be understood that the specific embodiments of the present invention as presented herein are intended to be by way of illustration only and are not limiting on the invention, and it is to be further understood that such embodiments, changes, or modifications may be made without departing from the spirit and scope of the invention as set forth in the claims appended hereto.

What is claimed is:

1. A hydraulic clamp comprising:

a clamp housing (2) having a front portion and a rear portion;

a guide bore (16) formed in the front portion of said clamp housing (2), said guide bore sloping rearwardly and upwardly from the front portion of said clamp housing;

a clamping member (5) having a driven portion (34) and being shiftably mounted within said guide bore (16);

a hydraulic cylinder (17) having a cylinder bore (18) formed generally horizontally in the rear portion of said clamp housing (2) and opening into said guide bore (16);

a piston (19) shiftably mounted within said cylinder bore (18); and a push/pull drive portion (30) disposed before said piston (19) so as to be connected to said piston (19);

said driven portion (34) of said clamping member (5) being interconnected with said push/pull drive portion (30) with a vertical gap therebetween such that when said push/pull drive portion is shifted with said piston within said cylinder bore, said push/pull drive portion (30) will force said clamping member (5) to shift in an inclined direction within said guide bore by the interconnection of said driven portion (34) with said push/pull drive portion (30).

2. A hydraulic clamp as set forth in claim 1, wherein said push/pull drive portion (30) is provided with an engagement projection (31) fixedly secured to said piston (19), said driven portion (34) is provided with an engaged groove (35) formed in said clamping member (5), and said engagement projection (31) is inserted into said engaged groove (35).

3. A hydraulic clamp as set forth in claim 1, wherein said cylinder bore (18) is formed in a rear lower portion of said clamp housing (2), said push/pull drive portion (30) is fixed to a front upper portion of said piston (19), and said driven portion (34) is formed in a rear lower portion of said clamping member (5).

4. A hydraulic clamp as set forth in claim 3, wherein a clamping/unclamping condition detection device (45) is disposed in a space above said cylinder bore (18) and behind said guide bore (16) said detection device (45) including a detecting portion (**46*a*) which is adapted to extend into said guide bore and engage a rear portion of said clamping member (5**).

5. A hydraulic clamp as set forth in claim 1, wherein said clamp housing (2) comprises a first housing (11) for said guide bore (16) and a second housing (12) for said cylinder bore (18), said first and second housings (11) (12) being connected to each other by a connecting member (14).

* * * * *